US011102001B2

(12) United States Patent
Sato

(10) Patent No.: US 11,102,001 B2
(45) Date of Patent: Aug. 24, 2021

(54) TRUST MANAGEMENT SYSTEM AND TRUST MANAGEMENT METHOD

(71) Applicant: HITACHI, LTD., Tokyo (JP)

(72) Inventor: Tatsuya Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 87 days.

(21) Appl. No.: 16/483,486

(22) PCT Filed: Jan. 18, 2018

(86) PCT No.: PCT/JP2018/001320
§ 371 (c)(1),
(2) Date: Aug. 5, 2019

(87) PCT Pub. No.: WO2018/142948
PCT Pub. Date: Aug. 9, 2018

(65) Prior Publication Data
US 2020/0021439 A1  Jan. 16, 2020

(30) Foreign Application Priority Data
Feb. 6, 2017  (JP) .............................. JP2017-019531

(51) Int. Cl.
*H04L 9/32* (2006.01)
*G06Q 20/06* (2012.01)

(52) U.S. Cl.
CPC ........... *H04L 9/321* (2013.01); *G06Q 20/065* (2013.01); *H04L 2209/38* (2013.01)

(58) Field of Classification Search
CPC ..... H04L 9/321; H04L 9/0637; H04L 9/0643; H04L 2209/38; G06Q 20/065; G06F 16/2379; G06F 16/27
See application file for complete search history.

(56) References Cited

U.S. PATENT DOCUMENTS

2015/0332283 A1   11/2015 Witchey
2017/0024817 A1*  1/2017 Wager .................. H04L 9/3234
(Continued)

FOREIGN PATENT DOCUMENTS

| JP | 2016-170530 A | 9/2016 |
| JP | 2017-220710 A | 12/2017 |
| JP | 2018-036893 A | 3/2018 |

OTHER PUBLICATIONS

"A Peer-to-Peer Electronic Cash System",[online], [retrieved on Sep. 1, 2016], Internet <URL:https://bitcoin.org/bitcoin.pdf>.
(Continued)

*Primary Examiner* — Eleni A Shiferaw
*Assistant Examiner* — Stephanie S Ham
(74) *Attorney, Agent, or Firm* — Mattingly & Malur, PC

(57) ABSTRACT

A verification node in a trust management system manages, in a blockchain, a smart contract and an execution transaction of the smart contract as well as an evaluation execution transaction for the smart contract. The verification node includes and manages a verification result of the smart contract in the evaluation execution transaction, the verification result including a predetermined value for evaluation specified by a predetermined one of transaction issuing nodes and an output value obtained when the predetermined value is inputted to the smart contract, or includes and manages the output value in state information.

8 Claims, 13 Drawing Sheets

(56) References Cited

U.S. PATENT DOCUMENTS

2017/0243215 A1* 8/2017 Sifford .................. H04L 9/3236
2017/0293669 A1* 10/2017 Madhavan .......... G06F 16/2365
2018/0097779 A1* 4/2018 Karame ............... G06Q 20/382
2018/0182048 A1* 6/2018 Stocker ................. H04L 67/104
2018/0183600 A1* 6/2018 Davis ................... H04L 9/3239

OTHER PUBLICATIONS

"Ethereum White Paper", [online],[retrieved on Sep. 1, 2016], Internet <URL:https://github.com/ethereum/wiki/wiki/[English]-White-Paper>.
"Hyperledger Fabric", [online], (retrieved on Sep. 1, 2016, Internet <URL:http://hyperledger-fabric.readthedocs.io/en/latest/>.
"chaintool", [online], (retrieved on Sep. 1, 2016, Internet <URL:https://github.com/hyperledger/fabric-chaintool>.
"Code Signing Certificate", [online],(retrieved on Sep. 1, 2016, Internet <URL:https://jp.globalisign.com/service/codesign/>.
2015 Autumn, vol. 19, No. 2, pp. 11-35, ISSN: 2185-4629 (Fuchita, Yasuyuki, Nomura capital markets quarterly) Nov. 1, 2015.
International Search Report dated Apr. 3, 2018 in corresponding international application No. PCT/JP2018/001320.

* cited by examiner

STATE INFORMATION D12

| CONTRACT ID | CONTRACT ENTITY | CONTRACT SPACE | INTERNAL TABLE | | | | | | |
|---|---|---|---|---|---|---|---|---|---|
| D1201 | D1202 | D1203 | D1204 | | | | | | |
| CARGO TRANSPORT CONTRACT | <BINARY> | REAL | CARGO ID | TIME | CONDITION | OPERATOR | MAXIMUM HUMIDITY | CONTRACT | PENALTY |
| | | | ... | ... | ... | ... | ... | ... | ... |
| | | | 123 | 2016/09/01 10:00 | ARRIVAL AT STOPPING POINT | CARRIER A | 60% | OBSERVED | 0 |
| | | | ... | ... | ... | ... | ... | ... | ... |
| | | | 125 | 2016/09/03 12:00 | SHIPPING COMPLETE | RETAILER A | 70% | OBSERVED | 0 |
| | | | ... | ... | ... | ... | ... | ... | ... |
| | | | 234 | 2016/09/04 12:30 | ARRIVAL AT STOPPING POINT | CARRIER B | 85% | VIOLATED | 2000 |
| | | | ... | ... | ... | ... | ... | ... | ... |
| | | EVALUATION (ID1) | CARGO ID | TIME | CONDITION | OPERATOR | MAXIMUM HUMIDITY | CONTRACT | PENALTY |
| | | | ... | ... | ... | ... | ... | ... | ... |
| | | | 345 | 2016/09/01 10:00 | ARRIVAL AT STOPPING POINT | CARRIER a | 85% | VIOLATED | 2000 |
| | | | ... | ... | ... | ... | ... | ... | ... |
| | | | 456 | 2016/09/03 12:00 | ARRIVAL AT STOPPING POINT | CARRIER b | 75% | OBSERVED | 0 |
| | | | ... | ... | ... | ... | ... | ... | ... |
| | | | 567 | 2016/09/04 12:30 | ARRIVAL AT STOPPING POINT | CARRIER b | 90% | VIOLATED | 4000 |
| | | | ... | ... | ... | ... | ... | ... | ... |
| | | EVALUATION (ID2) | ... | | | | | | |
| ... | | | | | | | | | |

{ D120 (upper data group), D121 (lower data group) }

FIG. 4

SMART CONTRACT TRUST D3

| PROVIDER | CONTRACT ID | FUNCTION NAME | TRUST | EVALUATOR |
|---|---|---|---|---|
| ... | ... | ... | ... | ... |
| MANUFACTURING BUSINESS A | CARGO TRANSPORT CONTRACT | TRANSPORT | 0.88 | CARRIER A, CARRIER B, MANUFACTURING BUSINESS A |
| ... | ... | ... | ... | ... |
| MANUFACTURING BUSINESS A | CARGO TRANSPORT CONTRACT | — | 0.85 | (OMITTED) |
| ... | ... | ... | ... | ... |
| MANUFACTURING BUSINESS A | — | — | 0.83 | (OMITTED) |
| ... | ... | ... | ... | ... |

TRUST MANAGEMENT SYSTEM AND TRUST MANAGEMENT METHOD

TECHNICAL FIELD

The present invention relates to a trust management system and a trust management method.

BACKGROUND ART

The distributed ledger technology has emerged as a technology that replaces transactions conventionally conducted by way of a trustworthy central authority such as a financial institution or a government with direct transactions by means of P2P (Peer to Peer) among users.

As an example of the distributed ledger technology, there exists a technology that conducts a payment transaction using a virtual currency called Bitcoin without involving the central authority such as a bank (see NPL 1). In such a payment transaction with the Bitcoin, a node called Miner makes a judgment on validity of transaction data (hereinafter also referred to as a transaction) on a P2P network, and a task called Proof of Work, which calculates a specific hash value, performs determination processing. The transaction thus determined is assembled into one block and posted in a distributed ledger called Blockchain (hereinafter also referred to as BC).

In addition, recently, a variety of derived technologies for the BC and the distributed ledger based on the BC implemented in the Bitcoin mentioned above are proposed and continue to evolve. Main characteristics of the current BC include: (1) In a transaction between participants on a BC network, the transaction is determined by agreement formation or an approval by (any or certain) participants, not by the central authority; (2) Falsification is substantially made impossible, by assembling a plurality of transactions as a block, recording them in a distributed ledger in a chained manner, and performing a hash calculation on a series of blocks; and (3) All of the participants share identical ledger data, thereby allowing for confirmation of a transaction by all of the participants.

With the characteristics described above, is under review application of the BC as a mechanism to manage/share trustworthy data and fulfill/manage a transaction in a wide range of fields such as a financial field or IoT (Internet of Thing) or the like. Use of an infrastructure provided by the BC (hereinafter referred to as a BC infrastructure) allows for sharing of information or transactions among a plurality of agents, even without being managed by the central authority (for example, a consortium in a specific industry, a plurality of businesses involved in a supply chain, or the like).

Moreover, a mechanism is created that makes the BC applicable to complicated transaction conditions or various application programs, in addition to a simple transaction of the virtual currency such as the Bitcoin. Thus, it is now possible to manage a logic as well as the (transaction) data in the BC. The logic is called a smart contract (hereinafter also referred to as an SC).

The BC infrastructures with a function to execute the above-mentioned SC (see NPLs 2 and 3) manage the SC itself and data inputted to the SC. Explained in an easy-to-understand manner, the SC itself is like a (plurality of) function(s). Then, input data is like a calling SC and a function name, or an argument to be given to a function. Use of the function to execute the SC makes it possible to execute the transaction according to a predefined contract.

Here, the SC and the input data thereof are each assigned a signature, and managed in the chained manner in the BC. Thus, having the BC infrastructure with the SC execution function defines a registrant of the data and the logic. Moreover, this makes it possible to ensure at any given time that there is no change to a registered content.

However, there is a problem that although SC users may be able to trust correctness of a SC provider or that there is no change to a once registered SC, the SC users may not know whether quality of a provided SC itself is good or bad. Therefore, there is a need for a means for the users (third party other than the provider) to evaluate/trust the quality of the SC.

In some cases, the SC in a binarized state or an encrypted state is maintained on the distributed ledger, which is a case of a black box for the users. Hence, the means to evaluate/trust the SC quality is of high importance.

To the problem, there is proposed a method (see NPL 4) of the SC provider carrying out a test or verification on the SC in advance in a development environment or the like (outside of the BC). There is also provided a technology (see NPL 5) for a certain approving body to examine a program, and the technology is applicable to examination of the SC.

CITATION LIST

Non Patent Literature

[NPL 1] "A Peer-to-Peer Electronic Cash System", retrieved on Sep. 1, 2016 from bitcoin.org/bitcoin.pdf.
[NPL 2] "Ethereum White Paper", retrieved online on Sep. 1, 2016 from github.com/ethereum/wiki/wiki/[English]-White-Paper.
[NPL 3] "Hyperledger Fabric", retrieved online on Sep. 1, 2016, from hyperledger-fabric.readthedocs.io/en/latest.
[NPL 4], (retrieved online on Sep. 1, 2016 from github.com/hyperledger/fabric-chaintool.
[NPL 5], retrieved online on Sep. 1, 2016 from jp.globalisign.com/service/codesign.

SUMMARY OF INVENTION

Technical Problem

As described above, there are means to evaluate credibility of the quality of an SC itself by a SC provider or a specific approving body, that is, a central authority. However, these means require management by the central authority, thus compromising non-centralization, the characteristic of a BC. That is, there is a problem that the credibility of the quality of the SC itself could not be confirmed/evaluated without being managed by the central authority.

Hence, an object of the present invention is to provide a technology that allows a plurality of third parties other than a smart contract provider to confirm and evaluate the credibility of the quality of a smart contract itself, even without the management by the central authority.

Solution to Problem

A trust management system of the present invention to solve the problem described above includes: a plurality of verification nodes each of which maintains a distributed ledger; and a plurality of transaction issuing nodes that issues a transaction to each of the verification nodes. The trust management system is characterized in that each of the verification nodes manages, in a blockchain managed by the each verification node, a smart contract and an execution transaction of the smart contract, as well as an evaluation execution transaction for the smart contract, and that each of the verification nodes either manages verification results of the smart contract included in the evaluation execution transaction, the verification results including a predetermined evaluation value specified by a predetermined one of the transaction issuing nodes and an output value when the predetermined value is inputted into the smart contract, or manages the output value included in state information.

In addition, a trust management method of the present invention is a trust management method of a distributed ledger system including: a plurality of verification nodes that each maintain a distributed ledger; and a plurality of transaction issuing nodes that each issue a transaction to each of the verification nodes, and is characterized in that of the distributed ledger system, each of the plurality of verification nodes manages, in a blockchain, a smart contract and an execution transaction of the smart contract, as well as an evaluation execution transaction for the smart contract, and that each of the verification nodes either manages verification results of the smart contract included in the evaluation execution transaction, the verification results including a predetermined evaluation value specified by a predetermined one of the transaction issuing nodes and an output value when the predetermined value is inputted in the smart contract, or manages the output value included in state information.

Advantageous Effects of Invention

According to the present invention, it is possible for a plurality of third parties other than a smart contract provider to confirm and evaluate credibility of quality of a smart contract itself, even without management by a central authority.

BRIEF DESCRIPTION OF DRAWINGS

FIG. 4 is a diagram illustrating a data structure example of state information on the distributed ledger of this embodiment.

FIG. 9 is a diagram illustrating a data structure example of a result of a smart contract trust calculation of this embodiment.

DESCRIPTION OF EMBODIMENTS

Example 1 (Embodiment 1)

Figure 1:
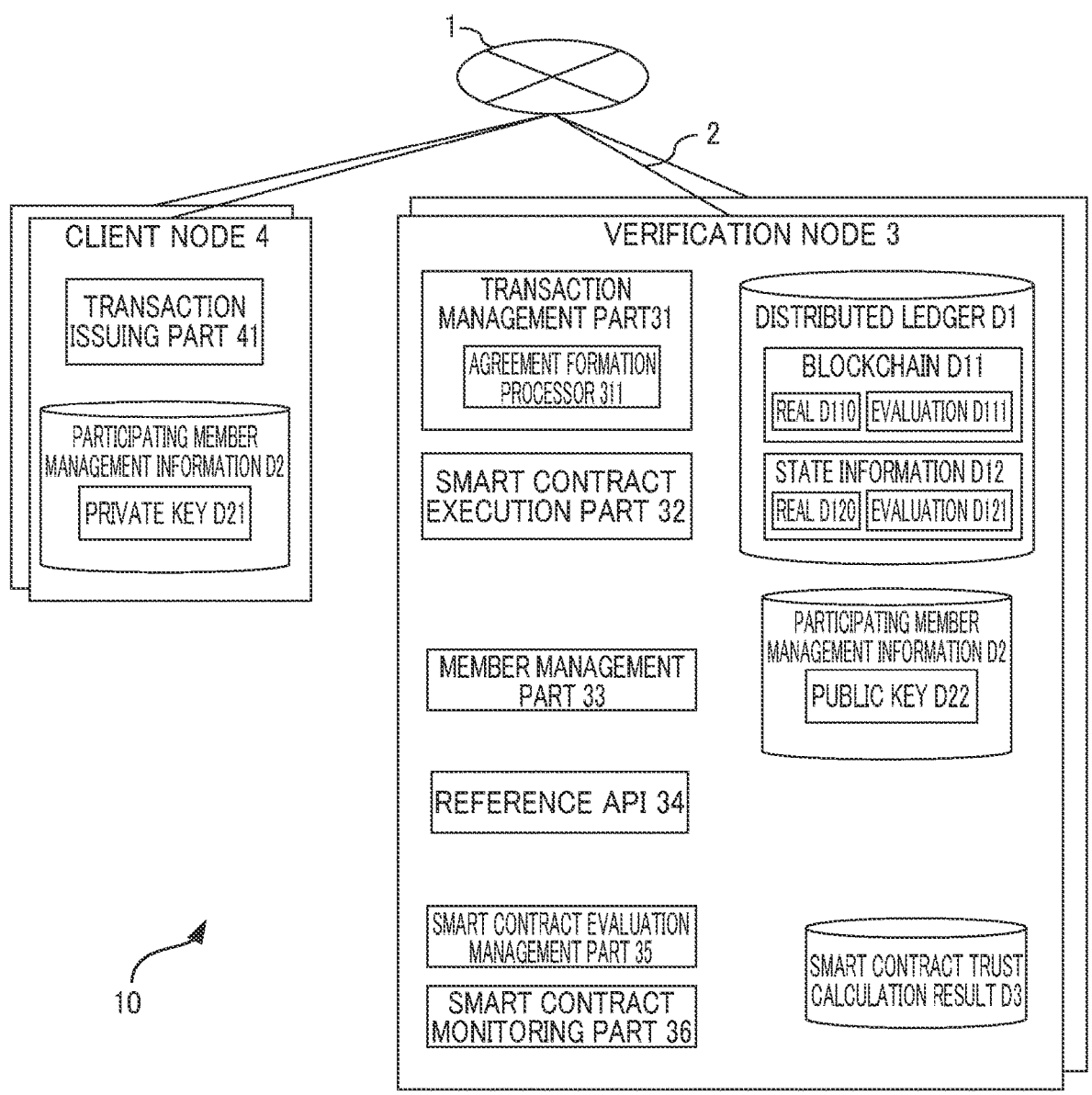
FIG. 1 is a diagram schematically illustrating a computer system in this embodiment.

As exemplified in FIG. 1, a distributed ledger system 10, which is a trust management system of this example, is an information processing system including a plurality of nodes such as a verification node 3 and a client node 4.

Each of the nodes in such a distributed ledger system 10 receives an execution transaction for evaluation (hereinafter referred to as an evaluation execution transaction) of an SC from any of other nodes. Then, using the evaluation execution transaction, each of the nodes executes the SC similarly to a real execution transaction for the SC (hereinafter referred to as a real execution transaction, and corresponding to an "execution transaction" in claims), and manages and retains, on a distributed ledger, respective histories of the real execution transaction and the evaluation execution transaction and execution results thereof.

In addition, each of the nodes makes an execution history of the above-mentioned evaluation execution transaction sharable among participants of a BC network. The BC network in this example represents a network including the verification nodes 3 and the client node 4 that use a predetermined smart contract together.

As described with reference to FIG. 1, such a distributed ledger system 10 includes one or more verification nodes 3 and one or more client nodes 4. These devices are connected to a network 1 via a physical communication line 2.

In this example, it is assumed that each of the above-mentioned verification nodes 3 is managed by a plurality of agents (for example, a plurality of operators). It is also assumed that one or more SC providers and a plurality of SC users each use the distinct client node 4.

Of the above-mentioned nodes, the verification node 3 includes functional parts such as a transaction management part 31, a smart contract execution part 32 (hereinafter also referred to as an SC execution part 32), a member management part 33, a reference API 34, a smart contract evaluation management part 35, and a smart contract monitoring part 36, and a data group such as a distributed ledger D1, participating member management information D2, and smart contract trust calculation result D3.

Of these, the transaction management part 31 includes an agreement formation processor 311. The verification node 3 receives a transaction from, for example, the client node 4 by means of a function of the transaction management part 31, and performs agreement formation with other verification node on whether or not to receive the transaction, by means of the agreement formation processor 311. In addition, when the agreement formation is done, by way of a function of the SC execution part 32, the verification node 3 performs deployment of an SC, real execution on the deployed SC, and evaluation execution processing on the deployed SC, and records histories of the transaction and execution results thereof in the distributed ledger D1. In addition, the reference API 34 of the verification node 3 provides a function to acquire/view history information of the evaluation execution transaction for a predetermined request from the other node.

In addition, the member management part 33 of the verification node 3 provides predetermined registration processing related to members (nodes) participating the BC network, newly issuance of keys to be used in transaction processing, an authentication function, or the like. In the member management part 33 in this example, it is assumed that authentication of a participating member or a signature on a transaction, control of an SC execution authority, or the like are performed, using a pair of a private key and a public key issued to each member. Note that public key information D22 to be used in the management of members described above is stored/managed on the participating member management information D2.

In addition, when receiving a transaction from the predetermined node, the transaction management part 31 appropriately checks whether an issuer of the transaction is a right participant with authority, by way of a function of the member management part 33. Because this function itself is a publicly known technology, description thereof is omitted.

In addition, the distributed ledger D1 stores/manages a blockchain D11 and state information D12. In this example, in order to make an evaluation execution transaction sharable on the BC, the block chain D11 and the state information D12 respectively retain both real execution transaction information (D110, D120) and evaluation transaction information (D111, D121).

On the other hand, the client node 4 includes the functional parts including a transaction issuing part 41 and the data group including the participating member management information D2. The SC users or providers issue various types of transactions by way of the transaction issuing part 41 of the client node 4 and transmits them to the verification node 3.

Note that as issuer information to be given to a transaction, the client node 4 uses authentication information (private key D21) of the member stored in the participating member management information D2. Note that a public key D22 of the participating member management information D2 is mutually exchanged between each of the client nodes 4 and the verification node 3.

In addition, the smart contract evaluation management part 35, the smart contract monitoring part 36, and the smart contract trust calculation result D3, which are retained by the verification node 3 in FIG. 1, are described after Example 2.

Figure 2:
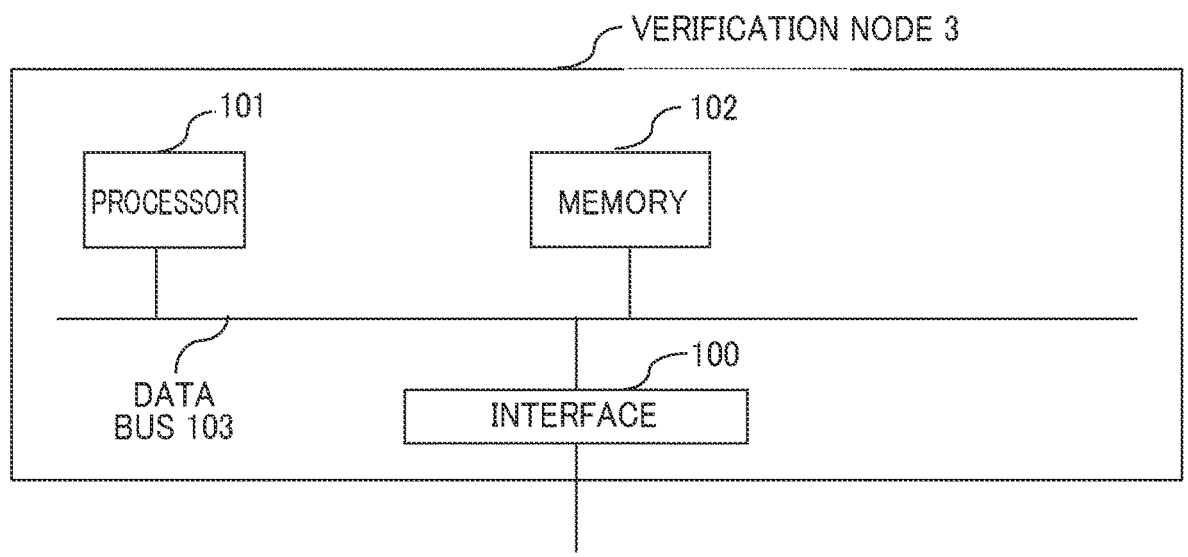
FIG. 2 is a block diagram illustrating a physical configuration of a verification node in this embodiment.

Here, of the respective nodes that configure the distributed ledger system 10 described above, byway of example, description is given of a hardware configuration of the verification node 3. FIG. 2 is a block diagram illustrating a physical configuration of the verification node 3 in Example 1.

The verification node 3 in this example is a calculator including an interface 100, a processor 101, and a memory 102. The interface 100, the processor 101, and the memory 102 are connected through a data bus 103.

The verification node 3 thus configured communicates with the network 1 via the interface 100. In addition, the processor 101 is an arithmetic device such as a CPU. The memory 102 is a storage area to retain a program and data. The processor 101 reads the program via a data bus 34 from the memory 102 and executes it. With the execution of the program, the respective functional parts exemplified in FIG. 1 are implemented.

Figure 3:
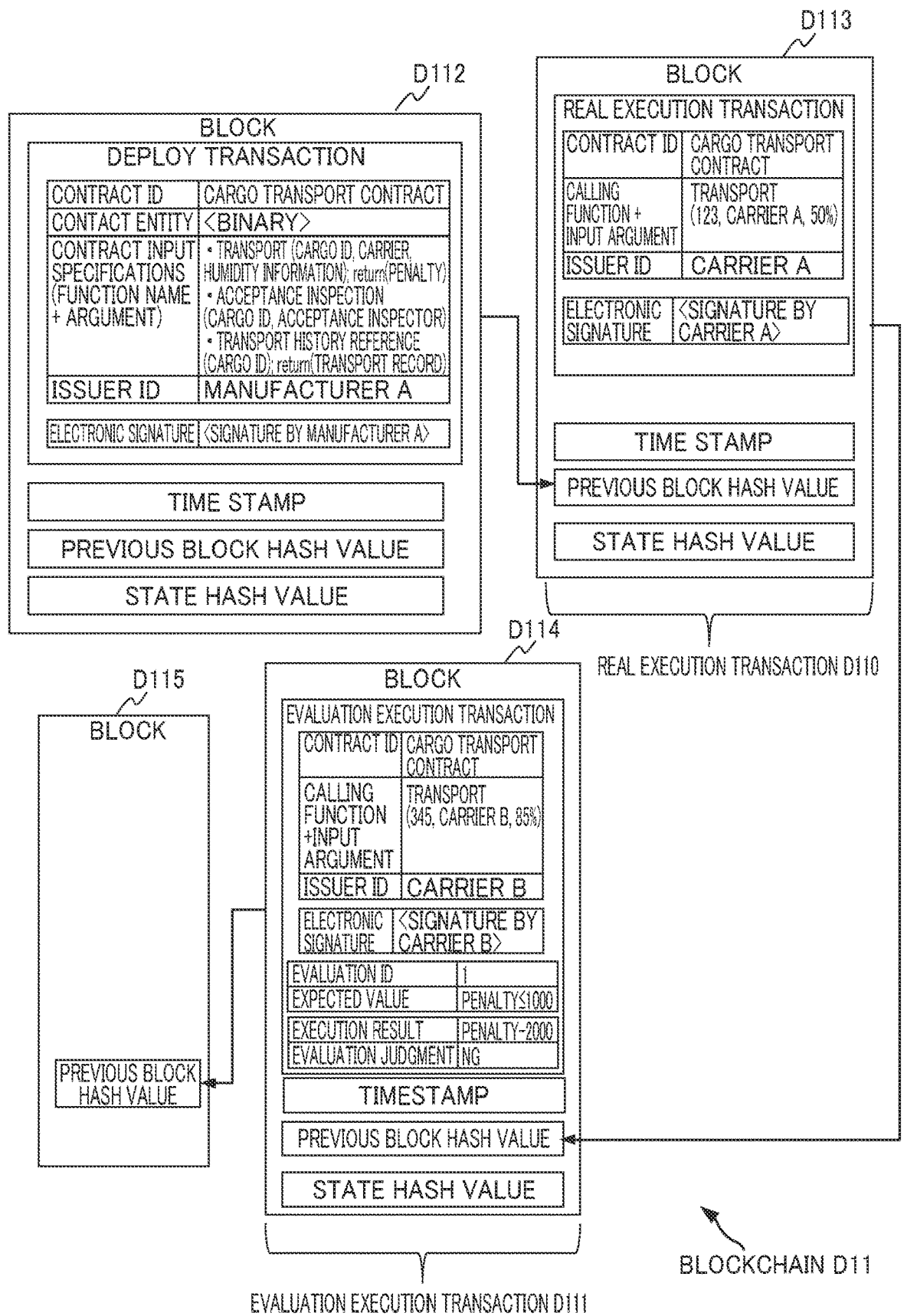
FIG. 3 is a diagram illustrating a data structure example of a blockchain on a distributed ledger of this embodiment.

Next, description is given of an example of the blockchain retained in the distributed ledger D1. FIG. 3 represents the blockchain D11 managed on the distributed ledger D1. In BC-type distributed ledger management, a plurality of transactions in a predetermined time slot is assembled as a block. Then, data is managed in a chained manner by each block having a hash value of a block in a previous time slot.

In the blockchain, if a value of a block of a last stage varies even by 1 bit, hash values of all subsequent blocks also vary. Thus, even if falsification is performed, it is sensed easily. Note that in this example, for simplicity of description, an example is assumed in which one transaction is stored in one block and a blockchain is generated by linking the block one after another. It can also be assumed, however, that a plurality of transactions is assembled and stored in one block and a blockchain is generated by linking such a block one after another.

The blockchain D11 illustrated in FIG. 3 is a blockchain in which blocks D112 to D115 are linked. For each of the blocks of the blocks D112 to D115 illustrated here, the block D112 includes information on a deploy transaction, the block D113 information on a real execution transaction, and the block D114 information on an evaluation execution transaction, respectively.

In addition, the blocks D112 to D115 each include time stamp information of when each of the blocks is generated. Furthermore, the blocks D112 to D115 each include a hash value of a previous block in linkage of the blockchain D11, and include a hash value generated from the state information D12 to be described below.

With such a data structure, the respective transactions of the deployment, the real execution, and the evaluation execution are managed as chained data in the blockchain D11.

Of the blocks that configure the above-mentioned blockchain D11, the block D112 is an example of a block storing the deploy transaction. The deploy transaction of this example includes a contract ID uniquely identifying an SC and an SC entity (for example, an executable binary). The deploy transaction also includes contract input specifications for the users to understand a function name or an argument thereof the SC has. In addition, the deploy transaction includes an issuer ID for identifying an issuing source of the deploy transaction, that is, a provider. The deploy transaction also includes an electronic signature to be used to verify that the issuing source or data has not been falsified. The electronic signature is generated using a private key of each BC network participating member (that is, the SC provider or the user) issued by the member management part 33, and can be verified with a public key paired therewith.

In addition, the block D113 is an example of a block that stores the real execution transaction. The real execution transaction of this example includes information on a contract ID of a smart contract that is a target of calling, and its function name and an argument to be inputted. The block D113 also includes an issuer ID for identifying an issuing source of the real execution transaction, that is, the user. The block D113 also includes an electronic signature to be used to verify that the issuing source and the data have not been falsified.

In addition, the block D114 is an example of a block that stores an evaluation execution transaction. Similarly to the real execution transaction, the evaluation execution transaction of this example includes information on the contract ID for identifying the smart contract, and its function name and the argument to be inputted. In addition, the block D114 includes an issuer ID for identifying an issuing source of the evaluation execution transaction, that is, the user. The block D114 also includes an electronic signature to be used to verify that the issuing source and the data have not been falsified.

The block D114 further includes an evaluation ID and an expected value as an evaluation of the smart contract, that is, information related to a verification result. Scenarios of the evaluation may include a case where it is desired to confirm an execution result for a plurality of transactions or a case where it is desired to execute a transaction from an initial state. Hence, in this example, the evaluation ID is introduced as an identifier to uniquely specify a series of evaluation scenarios. Furthermore, mutual influence between the evaluations can be eliminated by making a data area to be used in the state information D12 independent, for each evaluation ID.

Here, the expected value mentioned above is a value that is expected from an execution result of the evaluation execution transaction or an allowable range thereof. Note that in this example, the block D114 of the evaluation execution transaction stores/retains the execution result of the evaluation execution transaction. Normally, execution results of transactions can be acquired by tracing the BC and re-executing the respective transactions. However, since it is assumed that the users refer to the execution result of the evaluation execution transaction, processing efficiency is poor if the transaction is re-executed every time. This is because the evaluation execution transaction also stores the execution result. Furthermore, the block D114 of the evaluation execution transaction stores/retains evaluation judgment information, which is a result of judgment on whether or not the execution result of the evaluation execution transaction satisfies the expected value (for example, "OK" if it satisfies the expected value, or "NG" if not).

Next, description is given of the state information D12 managed on the distributed ledger D1. FIG. 4 is a diagram illustrating a data configuration example of the state information D12 managed on the distributed ledger D1.

In the BC-type distributed ledger management, normally, a BC must be traced to acquire (the latest) state (balance of an account in the case of the virtual currency, for example). Since this degrades the processing efficiency, there is a method of caching the latest state information, separately from the BC (Non Patent Literature 3, or the like). Also in this example, it is assumed that the nodes retain the latest state information. In this example, a state data area is prepared for each smart contract. Thus, the state information D12 retains the contract ID for uniquely identifying the smart contract and the entity of the contract. This enables the SC execution part 32 to acquire the entity of the smart contract and execute, with the contract ID as a key. The state information D12 also includes an internal table for retaining execution results of the SC. Each of the nodes updates content of the internal table every time the transaction is executed. The internal table has data areas (D120 and D121) for each of the real execution transaction and the evaluation execution transaction. This can prevent the evaluation execution transaction from influencing the real execution transaction and the respective evaluations from influencing each other.

Note that the distributed ledger D12 illustrated in FIG. 3 and FIG. 4 illustrates a specific example in which a blockchain infrastructure applies to a business contract related to cargo transport utilizing IoT. In the specific example is assumed a supply chain of a case in which when a certain cargo is shipped from a plant to a retailer, a plurality of carriers relays transport of the cargo. In addition, since an inspection is needed and shipment is stopped if maximum humidity of the cargo exceeds 80% in transit, as a business contract, is concluded among operators a contract stipulating that an operator that violates a humidity standard shall be liable for all damages. In addition, each cargo is an IoT device mounted with a humidity sensor, and humidity information of the cargo (certain type of IoT data) is acquired/recorded regularly. A node of each carrier registers the recorded humidity information with the BC every time transport by the carrier is complete, and automatically executes the smart contract associated with the business contract. Hence, identical trusted data can be shared among a plurality of operators and processing based on the contract can be automatically carried out.

The SC deployed in the block D112 illustrated in FIG. 3 is an SC that implements the above-mentioned business contract. This SC is provided as the contract ID "Cargo Transport Contract" by "Manufacturer A", which is an issuer. The following functions are defined therefor.

Function name: Transport( ), Input Argument: Cargo ID, Carrier, Humidity Information, Return Value: Penalty Function name: Acceptance Inspection( ), Input Argument: Cargo ID, Acceptance Inspector, Return Value: None Function Name: Transport History Reference( ), Input Argument: Transport ID, Return Value: Transport History Of the functions mentioned above, "Transport ( )" is core processing of the SC. The Transport( ) is called by the node of the carrier when the transport by each carrier is complete. When the cargo ID for identifying a target cargo, carrier information, and the humidity information obtained from the humidity sensor are registered as the input argument, inside the SC, a judgment is made on whether or not there is violation, depending on whether or not the maximum humidity exceeds 80%. If there is the violation, a penalty is calculated according to the exceeded humidity (usage-based calculation according to the humidity). Then, a result thereof is stored in the state information D12 and an amount of the penalty is returned as the return value.

In addition, the block D113 illustrated in FIG. 3 is an example of the real execution transaction that called the above-mentioned function "Transport( )". This example shows that the real execution transaction is the transaction when transport of the cargo ID "123" by "Carrier A" was complete and the humidity information obtained from the sensor was "60%". The state information D12 updated by the execution is a line of the cargo ID "123" in the internal table in D120.

As shown on the line, as a result of the execution of the SC, the maximum humidity does not exceed 80%, and thus the contract is "observed" and the penalty is "0". On the other hand, a line of the cargo ID "234" shows that since the humidity of the transport by "Carrier B" exceeds 80%, the contract is "violated" and the penalty of "2000" is incurred.

In the case of this example, since the SC is provided by the manufacturer, internal processing of the SC for the carrier, which is the user, is a black box. Therefore, the carrier only knows the input argument specification of the function for this SC. More specifically, the user cannot determine whether or not a computation expression to be processed inside the SC is reasonable, and whether or not there is any inconsistency in awareness. For example, this example includes whether or not the penalty is incurred if the humidity is exactly 80%, whether or not a result of calculation of the penalty according to the exceeded humidity matches assumption of the user, or the like.

In the case of the business contract, although it is expected that a written contract is separately present, statements in the contract often include ambiguous expressions, and thus it is likely that a determination cannot be made. On the other hand, with the SC, a risk is high because the contract is automatically carried out (and furthermore, it often involves a financial settlement).

In such a case, the execution function of the evaluation execution transaction in this example can be utilized.

In addition, the block D114 illustrated in FIG. 3 is an example of a block that stores the evaluation execution transaction on the function "Transport( )" of the above-mentioned smart contract. This example shows an evaluation of a case where with the evaluation ID as "1", "Carrier B" performs the transport of the cargo ID "345", and the humidity information is "85%". Here, as a result of the evaluation, the carrier sets "the penalty≤1000" as the expected value. On the other hand, the execution result of the evaluation execution transaction is "the penalty=2000" and does not satisfy the expected value.

With this, "Carrier B" can sense before the real execution that the internal processing of the SC does not satisfy its own expectations. In addition, the history being shared by other users, even though the user himself or herself does not evaluate, it can be checked whether expectation is met, as far as there are similar evaluation histories.

Figure 5:
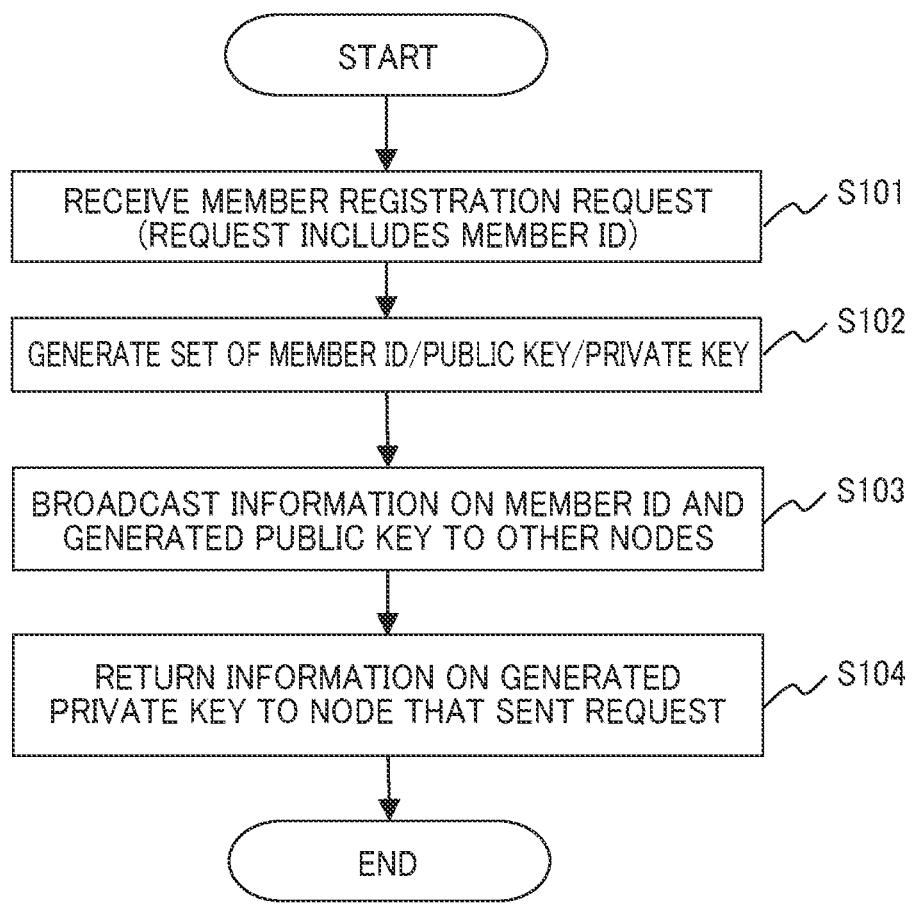
FIG. 5 is a diagram illustrating a flow example 1 of a trust management system of this embodiment.

Next, description is given of a flow example of a trust management method in this example. FIG. 5 is a flow chart illustrating an example of new registration processing of a member who participates in the BC network.

In this case, the member management part 33 of the verification node 3 receives a member registration request from other node such as the client node 4 (S101). Here, the member registration request mentioned above includes a member ID that uniquely identifies a requesting member.

Then, the member management part 33 generates a pair of the private key D21 and the public key D22 with a predetermined key generation tool or the like, and ties the pair to the member ID received in S101 (S102).

Then, the member management part 33 broadcasts to the other node the member ID, which is a target of new registration, and the public key D22 generated in S102 (S103). Here, each of information on the broadcast member ID and public key D22 is stored as the participating member management information D2, on each of the nodes.

Furthermore, the member management part 33 returns the private key D21 generated in S102 to the node that made the member registration request mentioned above (S104). The node that receives the private key D21 stores the private key D21 as its own private key D21 in the participating member management information D2.

In this example, it is assumed that authentication of the BC network participating member or the signature on the transaction, control of an SC execution authority, or the like are performed, by means of the pair of the private key and the public key thus generated. Specifically, for example, client node side issues a transaction electronically signed with the private key issued by the above-mentioned member management part 33, while verification node side can implement confirmation of identity by verifying the electronic signature using the public key of this client node. Note that a publicly known or well-known technique may be applied to a method of generating a pair of a public key and a private key, and a method of tying a key to an ID.

Figure 6:
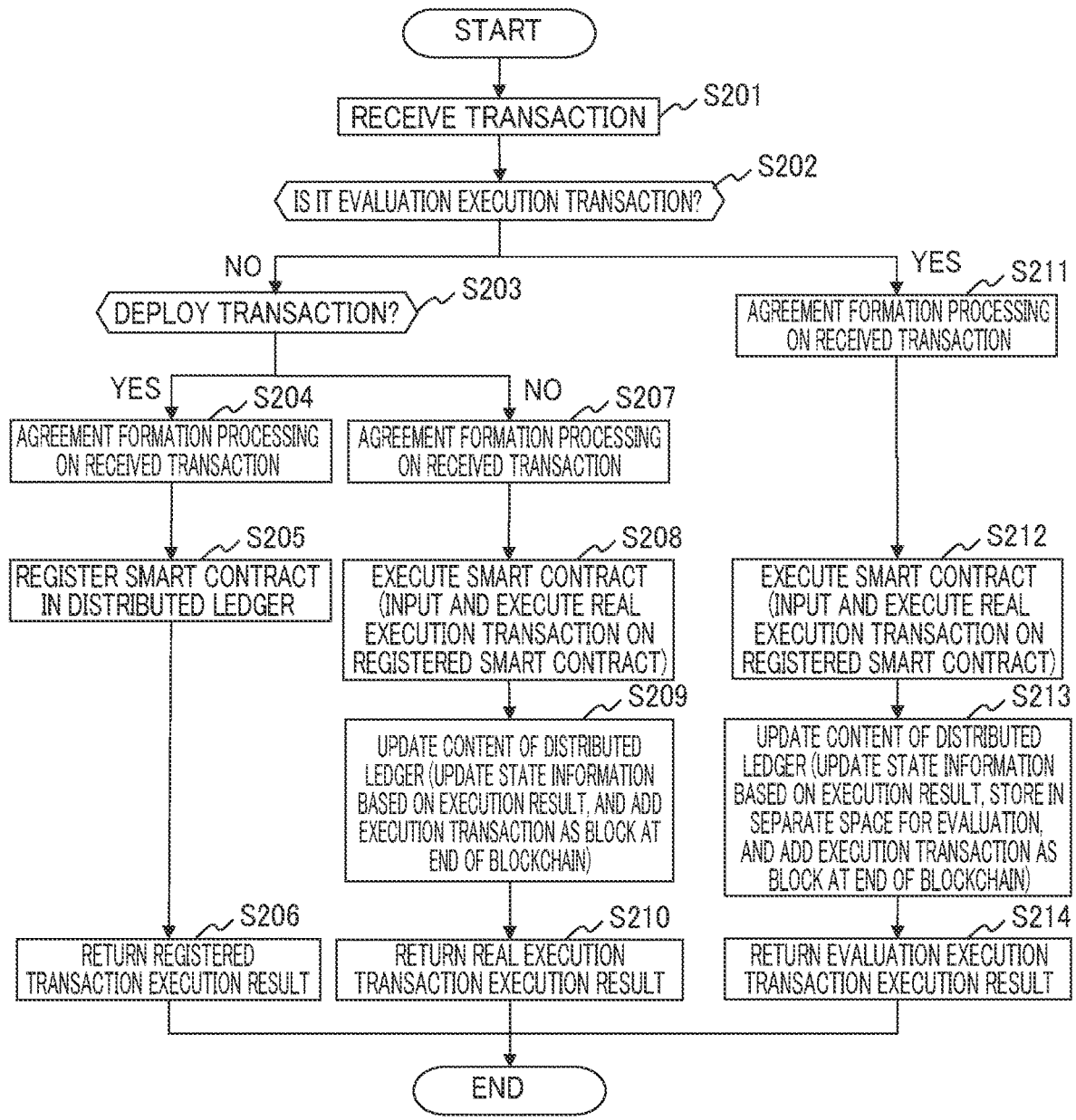
FIG. 6 is a diagram illustrating a flow example 2 of the trust management system of this embodiment.

Next, description is given of a flow example of transaction execution processing, more specifically, the SC deployment, the real execution, and the evaluation execution processing. FIG. 6 is a diagram illustrating a flow example 2 of the trust management method.

In this case, the transaction management part 31 of the verification node 3 receives a transaction from a transaction issuing source such as the client node 4 (S201).

In addition, the transaction management part 31 judges on a type of the transaction received in S201 (S202), and performs processing of the type found in the judgment, more specifically, each of the SC deployment, the real execution, and the evaluation execution processing.

As a result of the judgment mentioned above, if the received transaction is the deploy transaction (S202: NO, S203: YES), the transaction management part 31 performs processing of the agreement formation with other verification node 3 on whether the received transaction may be added as a block to the end of the blockchain D11 (S204). A publicly known or well-known technique may be applied to a specific agreement formation processing method.

Specifically, it is possible to adopt an algorithm called Practical Byzantine Fault Tolerance (PBFT), or the like. PBFT is an algorithm subject to an agreement by a certain number (two-thirds) of the nodes among all of the nodes (more specifically, the verification node) participating in the agreement formation.

Briefly explaining the agreement formation based on PBFT, the verification node 3 first broadcasts the received transaction to all of the verification nodes 3 participating in the network. Each of the verification nodes 3 verifies the signature to the transaction at each of the verification nodes 3 to confirm that the transaction has not been falsified or validity of content of the transaction. Then, the verification node 3 broadcasts a result of the confirmation to the other verification nodes 3. If the confirmation by a certain number of the verification nodes 3 or more is received, the verification node 3 broadcasts to the other verification nodes 3, informing that preparation for approval of the transaction is complete. Then, when it can be confirmed that preparation for approval by the certain number of the verification nodes 3 or more is complete, the agreement formation is complete.

When the agreement formation described above is complete, the transaction management part 31 registers with the distributed ledger D1 the SC included in the transaction by way of the SC execution part 32 (S205). Specifically, based on the content of the transaction, the transaction management part 31 registers the contract ID and the contract entity of the state information D12, and adds the lock including the deploy transaction to the end of the blockchain D11.

Then, the transaction management part 31 returns the execution result of the above-mentioned deploy transaction to the node of the transaction issuing source (S206) and terminates the processing.

On the other hand, if the received transaction is the real execution transaction (S202: NO, S203: NO), similarly to the deploy transaction, the transaction management part 31 performs the agreement formation processing with the other verification nodes 3 (S207). This agreement formation processing is similar to S204.

After the agreement formation described above is complete, the transaction management part 31 executes the SC by way of the SC execution part 32 (S208). Specifically, the transaction management part 31 gives the calling function and the input argument specified in the real execution transaction to the SC (assuming that the SC has been registered) having the contract ID specified in the real execution transaction and performs the SC.

The transaction management part 31 updates contents of the distributed ledger D1 based on the execution result thereof (S209). The transaction management part 31 also updates the state information D12 related to this smart contract, based on the above-mentioned execution result, and adds the real execution transaction as the block at the end of the blockchain D11.

Lastly, the transaction management part 31 returns the execution result (for example, the return value of function)

of this real execution transaction to the node of the transaction issuing source (S210) and terminates the processing.

On the other hand, if the received transaction is the evaluation execution transaction (S202: YES), similarly to the deploy transaction, the transaction management part 31 performs the agreement formation (S211). This agreement formation processing is similar to S204.

Then, when the agreement formation is complete as described above, the transaction management part 31 executes the SC with the evaluation execution transaction as input, by way of the SC execution part 32 (S212). Specifically, the transaction management part 31 gives the calling unction and the input argument specified in the evaluation execution transaction to the SC (utilizing a same binary as the real execution transaction) having the contract ID specified in the evaluation execution transaction and executes the SC.

The transaction management part 31 updates the state information D12 related to the smart contract in the distributed ledger D1, based on the execution result of the smart contract mentioned above (S213). Then, the transaction management part 31 stores the state information D12 in the data area for the evaluation execution transaction of each evaluation ID, which is prepared separately from that for the real execution transaction. The transaction management part 31 also adds the evaluation execution transaction and the execution result thereof as the block at the end of the blockchain D11.

Lastly, the transaction management part 31 returns the execution result (for example, the return value of the function and the evaluation judgment) of the evaluation execution transaction to the transaction issuing source (S214) and terminates the processing.

With the flow described above, the transaction evaluation execution using the input identical to the real execution transaction is implemented, using the smart contract entity identical to the real execution transaction, without contaminating the data area for the real execution transaction.

Figure 7:
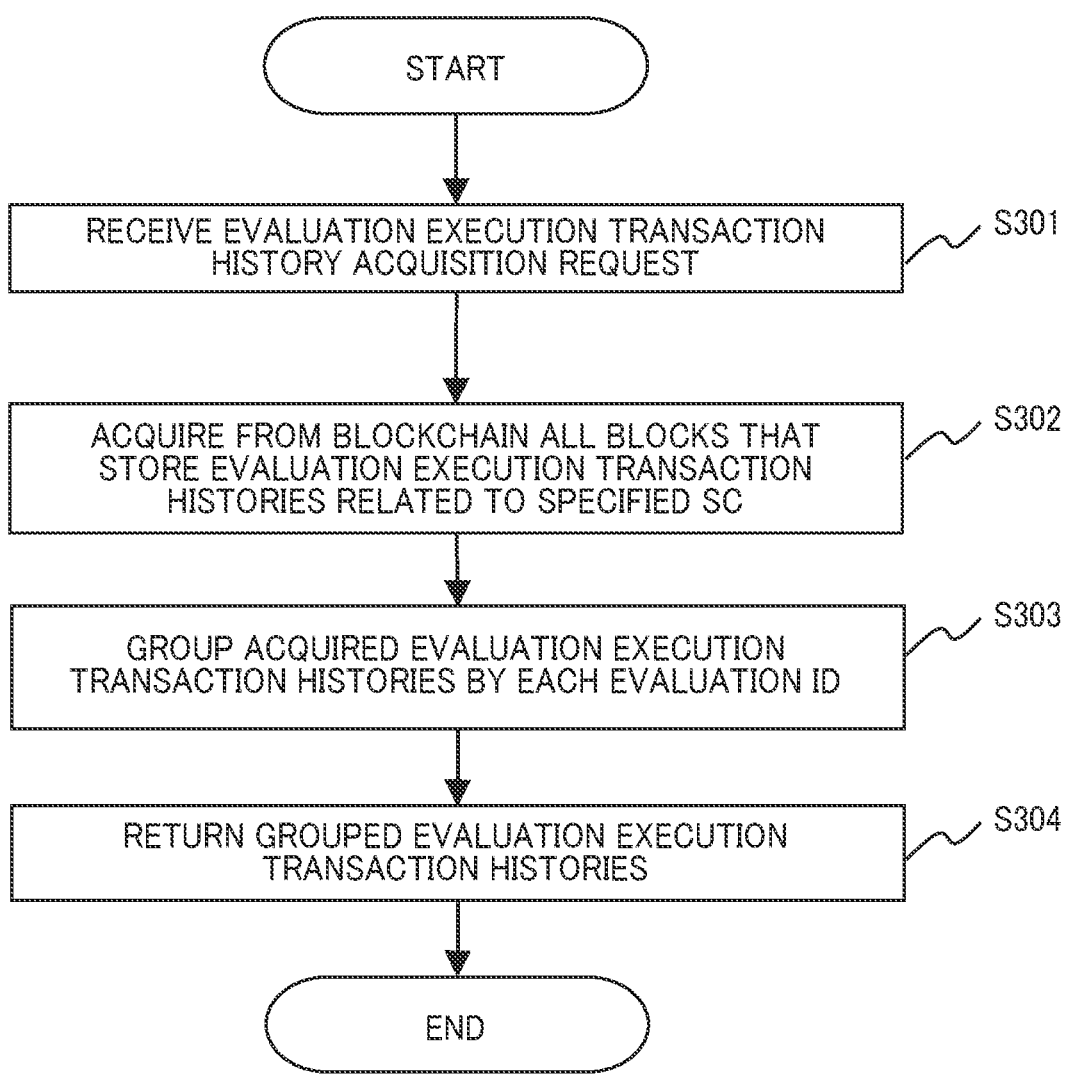
FIG. 7 is a diagram illustrating a flow example 3 of the trust management system of this embodiment.

Here, for the evaluation execution transaction described above, description is given of processing performed by the reference API 134 of the verification node 3. FIG. 7 is a diagram illustrating acquisition flow of the evaluation execution transaction history by the reference API 134.

In this case, the reference API 134 receives an evaluation execution transaction history acquisition request from the client node 4, or the like (S301). This request necessarily specifies a contract ID of an SC targeted for acquisition and may further specify a calling function name, a user, an evaluation ID, and an expected value, as needed.

When receiving the above-mentioned request, the reference API 134 acquires all blocks that store evaluation execution transaction histories related to the specified SC from the blockchain D11 on the distributed ledger D1 (S302).

In addition, the reference API 134 groups the evaluation execution transaction histories acquired in S302 by each evaluation ID (S303).

In addition, the reference API 134 processes the evaluation execution transaction histories grouped in S303 (for example, as an array in JSON (JavaScript (Registered Trademark) Object Notation) format), returns the processed histories to the requesting node (S304), and terminates the processing.

As described above, for a provided SC, the provider and the user can perform an evaluation of a transaction thereof. Moreover, the evaluation result thereof is managed with the real execution transaction in linkage of BC data and can be shared with other participants. This mechanism enables the SC user to check/evaluate whether or not the SC is trustworthy, without being managed by the central authority. In addition, management of the evaluation execution transaction in the BC data linkage makes falsification difficult and allows for disclosure to the BC network participants. Furthermore, since the users of the respective nodes can confirm/evaluate the credibility of the SC as needed, the mechanism also produces an effect of suppressing provision of an SC with poor quality by a malicious provider. Through attempts/evaluations by smart contract providers and a plurality of third parties, the credibility of the smart contract can be enhanced, compared to the conventional centralized evaluation method. Moreover, sharing of information related to the credibility has the effect of saving efforts, compared to a case where the third parties individually verify the smart contract.

In addition, it is possible to execute the transaction evaluation using input identical to the real execution transaction, by identifying the evaluation execution transaction and using the smart contract entity identical to the real execution transaction. This also has the effect of being able to evaluate the smart contract without contaminating data of the real execution transaction.

Example 2

In the following, as a variation of a form of utilizing the evaluation execution transaction shared on a BC, a case is shown where the trust of the SC is calculated through the use of the evaluation execution transaction histories.

In this example, description is given of functions or the like, based on the smart contract evaluation management part 35 in the verification node 3 and the smart contract trust calculation result D3, of a computer system, which is the distributed ledger system 10 exemplified in FIG. 1. In the following, description is given of only parts different from Example 1 and that of parts similar to Example 1 is omitted.

The smart contract evaluation management part 35 (hereinafter also referred to as the SC evaluation management part 35) in this case calculates smart contrast trust (hereinafter also referred to SC trust) using evaluation execution transaction history D111 on the blockchain D11, the SC trust being an index that quantitatively indicates a degree of how much the SC or the provider can be trusted, and stores/retains a result thereof on the smart contract trust calculation result D3 (hereinafter also referred to as an SC trust calculation result D3). Here, the above-mentioned SC trust is scored between 0.0 and 1.0, and a higher value represents higher credibility.

Figure 8:
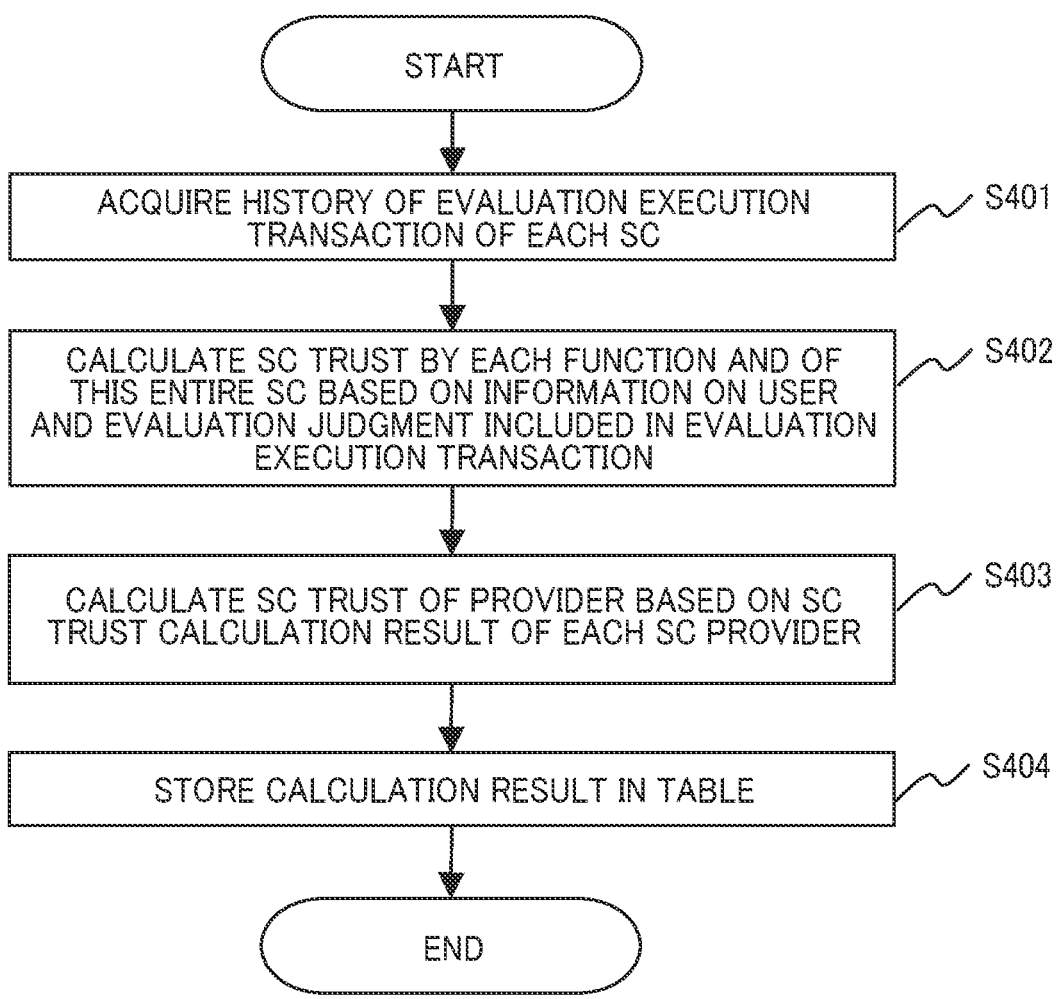
FIG. 8 is a diagram illustrating a flow example 4 of the trust management system of this embodiment.

FIG. 8 is a flow chart illustrating an example of smart contract trust calculation processing based on the evaluation execution transaction histories. The SC evaluation management part 35 in this case acquires all of the evaluation execution transaction histories of each SC from the blockchain D11 of the distributed ledger D1 via the reference API 134 (S401). FIG. 3 taken for example, the block D114 or the like is acquired.

Next, the SC evaluation management part 35 calculates the SC trust by the function and of the entire SC, based on information on each of the user (issuer) and the evaluation judgment included in the each of the evaluation execution transactions acquired in S401 (S402).

For example, in this example, the SC trust by the function of each of the SCs is determined based on a proportion of the number of "OK" cases, not the number of "NG" cases, of all cases of the evaluation execution transactions. Furthermore, weighting is performed, considering an evaluation made by the user more objective and trustworthy than that made by the provider. For example, if the user of the evaluation execution transaction is not the provider of the smart contract, a double weight is given.

Here, with the example of the blockchain D11 used in FIG. 3 as an example, a case is assumed where the histories of the evaluation execution transaction of the function "Transport( )" in the smart contract are as follows.

The number of cases of the SC evaluations executed by "Manufacture A" is 10, of which 10 cases have the evaluation judgment of "OK".

The number of cases of the SC evaluations executed by "Carrier A" is 5, of which 4 cases have the evaluation judgment of "OK".

The number of cases of the SC evaluations executed by "Carrier B" is 15, of which 13 cases have the evaluation judgment of "OK".

In this case, the number of SC evaluations executed is 10 cases×once+5 cases×twice+15 cases×twice=50 cases. In addition, the number of cases with the evaluation judgment of "OK" is 10 cases×once+4 cases×twice+13 cases×twice=44 cases. Therefore, the SC trust of this function is 44/50=0.88. Furthermore, in this example, the SC trust of each of the SCs is determined with an average of the SC trust of the respective functions as calculated above.

Then, the SC evaluation management part 35 calculates the SC trust of the providers based on the SC trust calculation result of each of the SC providers (S403). In this example, the SC trust is calculated with an average of the SC trust of all SCs by a certain provider.

Lastly, the SC evaluation management part 35 stores the calculation result of the SC trust as determined above in the SC trust calculation result D3 (S404) and terminates the processing.

FIG. 9 is an example of a data structure of the SC trust calculation result D3. In this example, the calculation result of the SC trust can be retained in a table in this manner. In the table, trust D304 is managed, being associated with an SC provider D301, an SC contract ID (D302), and a function name D303. In addition, as indicated by an evaluator D305, the evaluation of the smart contract, more specifically, information on the BC network member who does the trust calculation, may also be saved. A line D311 in the smart contract trust D304 shows the SC trust of a certain function, a line D312 shows the SC trust of a certain SC, and a line 313 shows the SC trust of a certain provider, respectively.

Note that although in the SC trust shown in this example, the calculation is performed, as a simple case, based on the proportion of the "OK" cases, the calculation may be performed by multiplication of the number of executed evaluations. This makes it possible to perform a calculation so that the trust will be lower if the evaluations are not adequate because the number of attempts or tests is small.

Quantification of the trust of the smart contract in this manner makes it possible to understand at a glance whether or not the SC, its functions, or its provider can be trusted. Utilization of the test/evaluation results by the plurality of third parties in this manner has the effect of being able to perform the trust evaluation of the SC in a more objective manner.

Example 3

Next, description is given of a case where execution of a transaction is controlled by utilizing the histories of the evaluation execution transaction. Note that a configuration of the computer system, which is the distributed ledger system 10 in this example, is similar to that of Example 1 or Example 2 described above. In addition, if the SC trust is used as judgment criteria for execution control of transactions, the configuration of Example 2 is used. On the other hand if the SC trust is not used, that of Example 1 is used.

As an example of the execution control mentioned above, this example shows a case where real execution of a transaction is disapproved, depending on the conditions of the evaluation.

Figure 10:
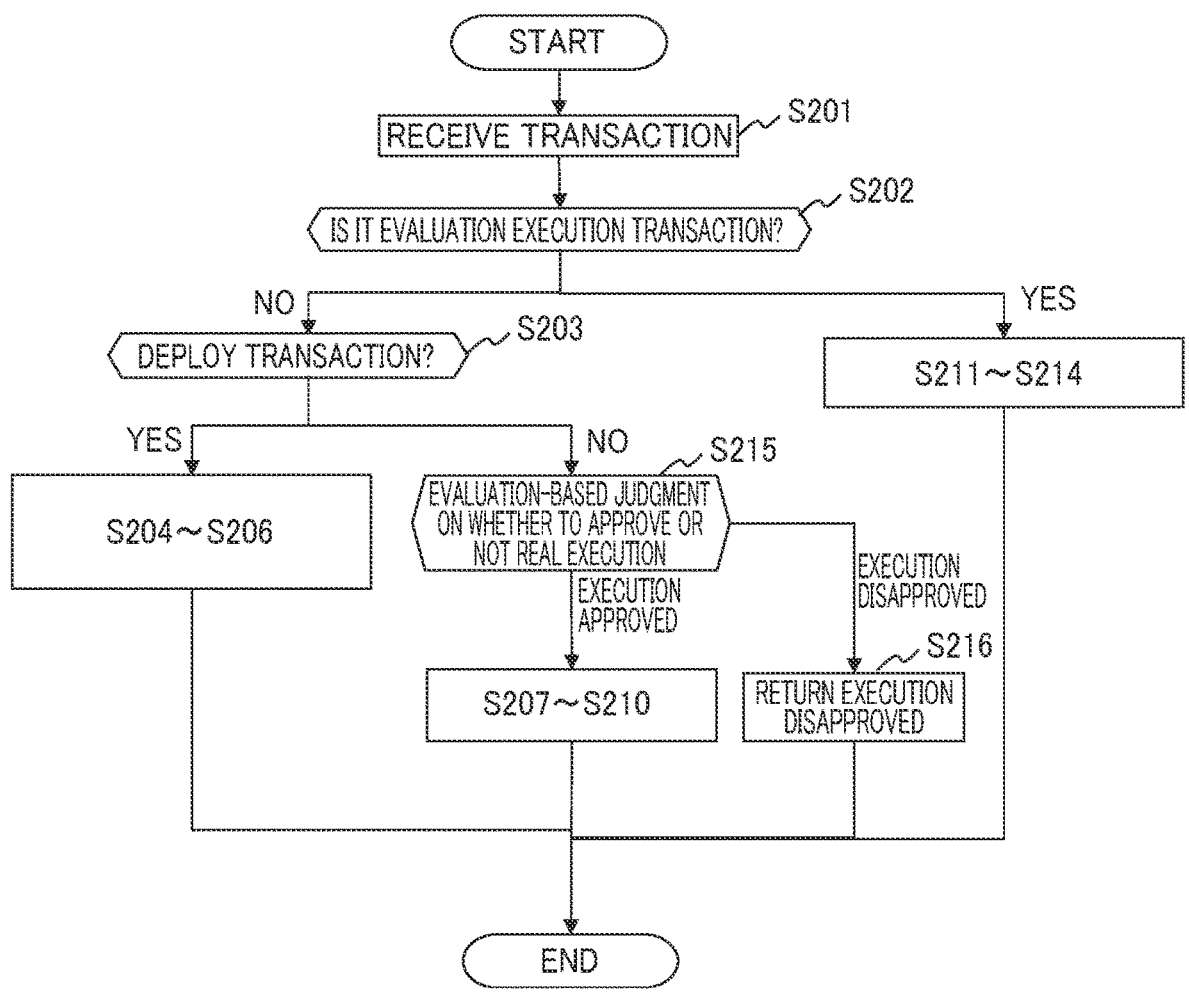
FIG. 10 is a diagram illustrating a flow example 5 of the trust management system of this embodiment.

FIG. 10 is an example of a flow chart including real execution judgment processing based on evaluation conditions of a smart contract. Since this flow chart is substantially same as FIG. 6, here, description is given of only differences.

In this case, if the transaction received from the node is the real execution transaction (S203: NO), the transaction management part 31 performs judgment on whether or not to perform the real execution based on the conditions of the evaluation to which the SC relates to (S216).

Examples of the judgment criteria include variations such as referring to the evaluation execution transaction histories of the blockchain D12 and "execution to be disapproved unless the SC provider performs at least one or more evaluation execution transactions on this Sc", "execution to be disapproved unless the plurality of users performs the evaluation execution transactions", referring to the SC trust calculation result D3 and "execution to be disapproved unless the SC trust exceeds a certain threshold" or the like.

As a result of the judgment described above, if the real execution is "execution approved" (S215: execution approved), the transaction management part 31 executes the real execution transaction, similarly to S207 to S210. On the other hand, as a result of the judgment described above, if the real execution is "execution disapproved" (S215: execution disapproved), the transaction management part 31 does not execute the real execution, returns to the execution disapproved (error message, for example) to the node of the transaction issuing source (S216), and terminates the processing.

In this manner, the smart contract evaluation result (SC trust calculation result) or whether or not the evaluation execution transaction has been stored in the block can be utilized in the execution control of the transactions based on the trust of the smart contract.

As other variations of the execution control, for example, an example is possible where a queue with transaction priority is arranged between S201 and S202, and a transaction that should be preferentially executed is controlled in accordance with the conditions of the evaluation.

For example, a control method is possible in which if load of an entire system is high, the real execution precedes the evaluation execution; and priority is given to a transaction for which the number of evaluations executed is smaller or trust is lower among the evaluation executions. In addition, as another example, for the evaluation execution transaction that is already highly trustworthy because the number of executed evaluations is already large and the trust is already high, a control method is also possible in which the evaluation execution transaction is not accepted.

Example 4

Next, description is given of an example in which the histories of the real execution transaction as well as the evaluation execution transaction are utilized, as a variation of the SC trust calculation in Example 2 described above.

Note that the configuration of the computer system, which is the distributed ledger system 10 in this example, is similar to that of Example 2 and only the internal SC trust calculation processing is different.

Figure 11:
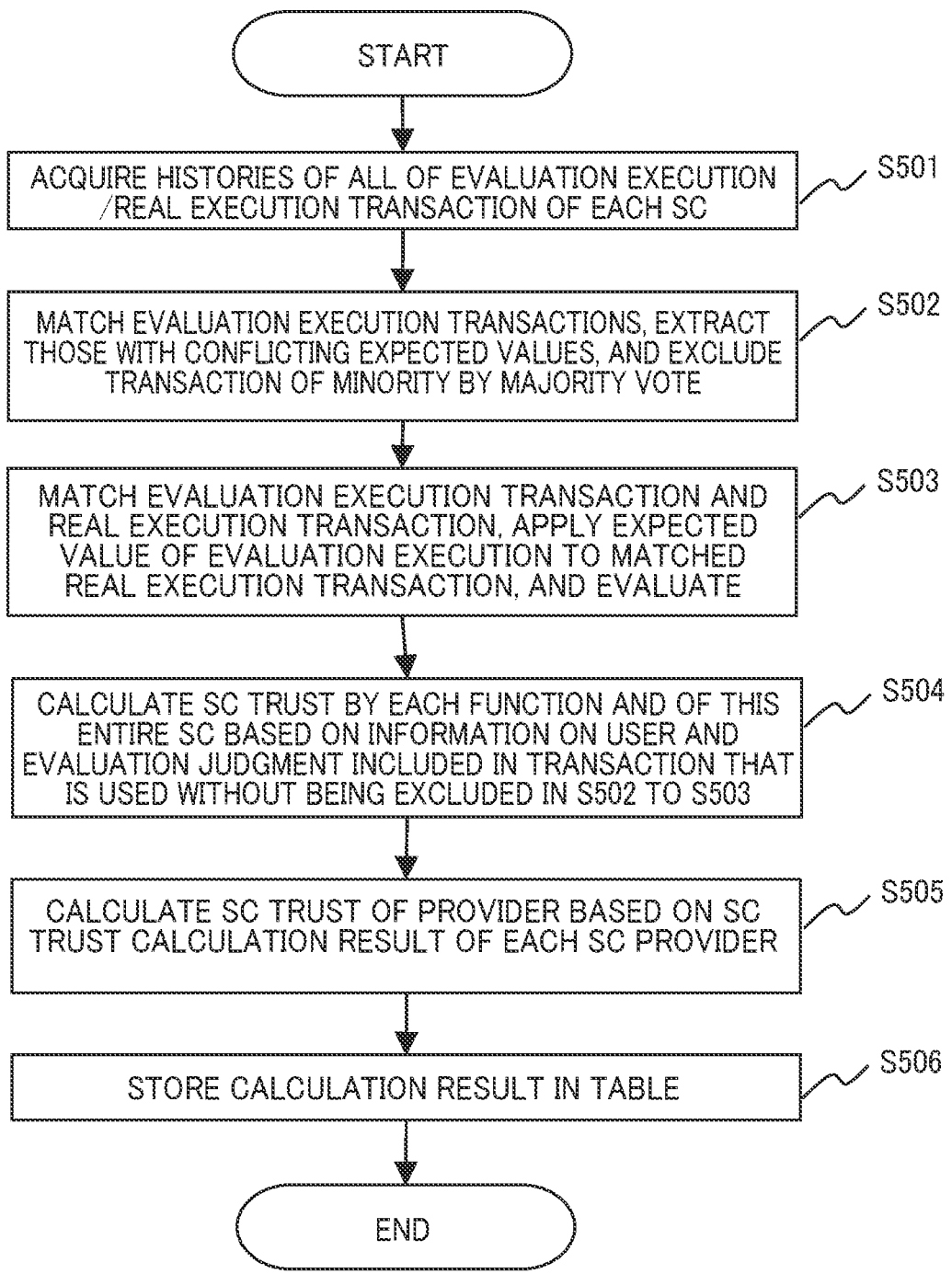
FIG. 11 is a diagram illustrating a flow example 6 of the trust management system of this embodiment.

FIG. 11 illustrates a flow example of the smart contract trust calculation processing based on each of the real execution transaction and the evaluation execution transaction.

In the calculation method described in this example, the expected value of the evaluation execution transaction is applied to the real execution transaction. An error in the expected value between the evaluation execution transactions is also taken into consideration. As assumption for implementation thereof, broad matching allows for a match between the evaluation execution transactions or between the evaluation execution transaction and the real execution transaction.

A few specific implementation methods are present. For example, in each of the evaluation execution transactions, at the time of issuance, the SC user specifies an important argument influencing the expected value of the input arguments. For example, in the example of FIG. 3, of the input arguments, "Cargo ID" is not important in the evaluation (more specifically, it may be any value), and "Humidity Information" is important. Another implementation method may define a range of input values or input conditions, not a specific fixed value, for the input arguments. Utilization of the information can achieve a match between the transactions, even without setting a precondition that items completely match.

In this case, the SC evaluation management part 35 acquires all of the histories of the evaluation execution transaction and the real execution transaction for each SC from the blockchain D11 of the distributed ledger D1 via the reference API 134 (S501). This is similar to S401, except that the real execution transaction is also targeted.

Then, the SC evaluation management part 35 matches the evaluation execution transactions acquired in S501, and extracts those the expected values of which are conflicting. Then, by majority vote of the users who issued the conflicting transactions, a transaction of minority is excluded from the transactions targeted for calculation (S502).

For example, suppose that for same input, the evaluation execution transaction with the expected value of "1000≤penalty≤2000" is executed by the users "Carrier A" and "Manufacturer A", and that the transaction with the expected value of "Penalty=0" is executed by the user "Carrier B". In this case, the SC management part 35 excludes the transaction with the expected value of "Penalty=0". Note that this method is an example to respond to a case where the expected values are conflicting, and the weighting may be performed based on the trust of the user himself/herself, or the like, for example.

Furthermore, the SC evaluation management unit 35 matches the evaluation execution transaction and the real execution transaction, applies the expected value of the evaluation execution to the matched real execution transaction, and evaluates it (S503).

In the following, the SC evaluation management part 35 calculates the SC trust by the function and that of the entire SC, and the SC trust of the provider, based on the information on each of the user (issuer) and the evaluation judgment included in the transaction that is used without being excluded in S502 to S503 described above, and stores a result thereof in the SC trust calculation result D3 (S506). The processing is similar to that of S402 to S404, except that the transactions used as a calculation target are different.

As described above, the calculation of the SC trust utilizing the histories of the real execution transaction as well as the evaluation execution transaction in this manner can increase the number of samples to be used in the calculation. Consequently, this has the effect of achieving better calculation precision than Example 2. In addition, consideration of the transactions with conflicting expected values has the effect of improving the calculation precision better than the Example 2.

Example 5

Next, description is given of an application example in which SC health or credibility is monitored by automatic issuance of the evaluation execution transaction. A configuration of the computer system, which is the distributed ledger system 10 of this example, differs from the configurations of the above-described Examples 1 to 4 in that the smart contract monitoring part 36 (hereinafter referred to as the SC monitoring part 36) functions.

Figure 12:
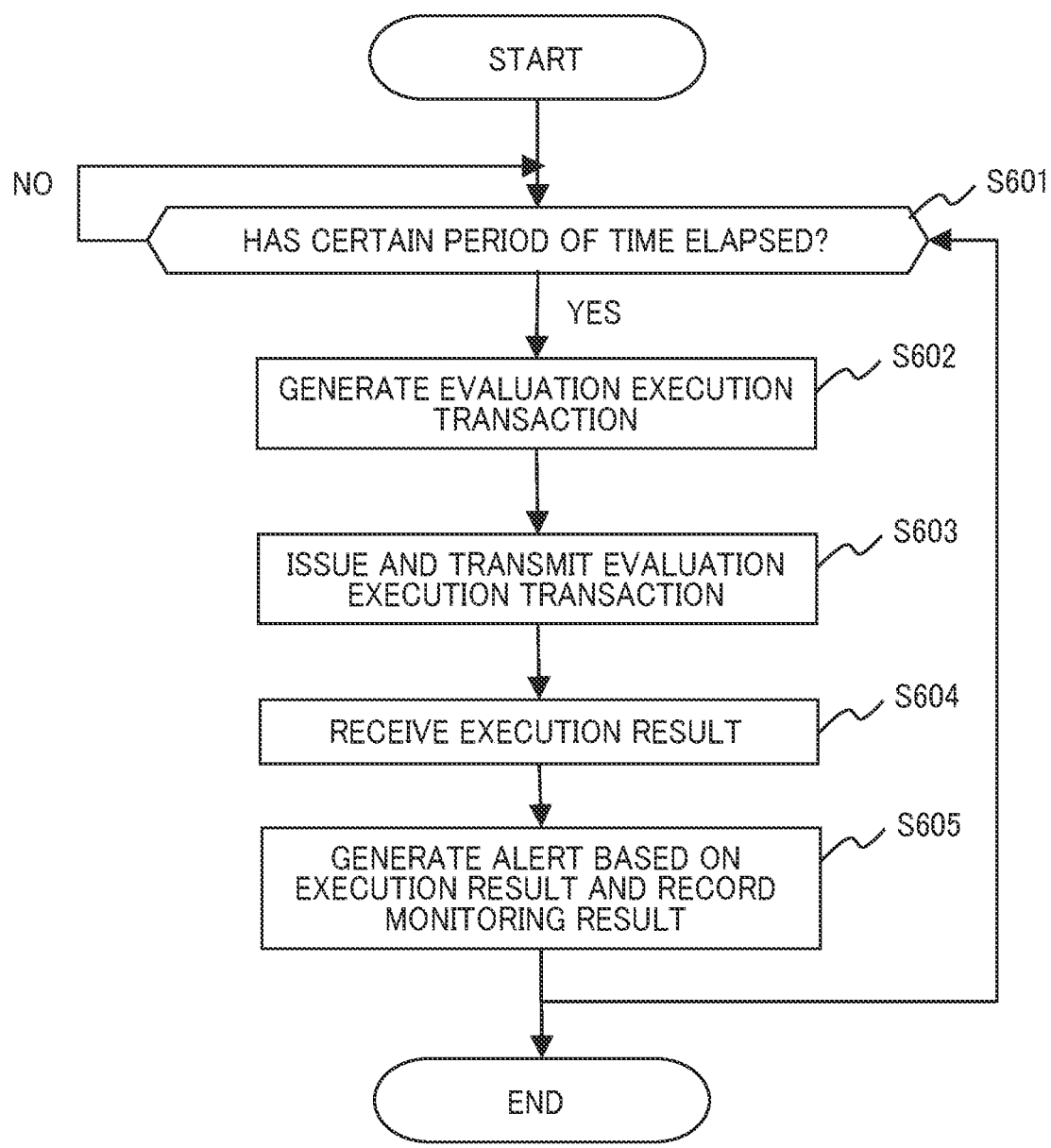
FIG. 12 is a diagram illustrating a flow example 7 of the trust management system of this embodiment.

FIG. 12 is a flow chart illustrating an example of processing of monitoring the SC health or credibility by automatic issuance of the evaluation execution transaction.

In this case, the SC monitoring part 36 generates the evaluation execution transaction (S602) every time a predetermined period of time elapses (S601: YES). In the generation of the evaluation execution transaction, the targeted evaluation execution transaction may be defined in advance or the evaluation execution transaction histories may be referred to and diverted. In addition, similarly to Example 4, the important items of the input arguments for the evaluation execution transaction or the range of input arguments or the input conditions may be defined, and some information of the evaluation execution transaction may be automatically generated by the SC monitoring part 36. Furthermore, the evaluation execution transaction may be generated as a single case or as a plurality of cases.

Then, SC monitoring part 36 transmits the evaluation execution transaction generated in S602 to the transaction management part 31 (S603). In this case, the transaction management part 31 receives the evaluation execution transaction transmitted in S603 and executes the SC according to the flow illustrated in FIG. 6 or the like.

The SC monitoring part 26 receives a result of the SC execution in the transaction management part 31 described above (S604).

In addition, the SC monitoring part 36 generates an alert or records monitoring results, or the like, based on the execution result obtained in S604 (S605). For example, if the evaluation judgment in the execution result obtained in S604 is "NG", the SC monitoring part 36 notifies an external monitoring system of the alert or transmits an alert mail to an operations manager or the SC users. In addition, the SC monitoring part 36 may generate, as a monitoring result record, a record from a date and time of execution, "OK" or "NG" of the evaluation judgment, or time taken for processing, or the like, registers this record in a predetermined database for log management, etc., and later perform an analysis of operation tendency such as a normal operation rate, or the like.

It is possible to perform monitoring for falsification of the smart contract or the like by automatically issuing the evaluation execution transaction at arbitrary timing in this manner and performing an unannounced smart contract evaluation. Therefore, as a result, there is the effect of suppressing malicious falsification by the smart contract providers and being able to continuously maintain the credibility of the smart contracts. Moreover, if health of service is monitored by issuance of a dummy transaction in the BC infrastructure as has been done conventionally, the real environment might be contaminated. However, this example has the effect of being able to perform monitoring without contaminating the real environment, by dividing data areas.

Figure 13:
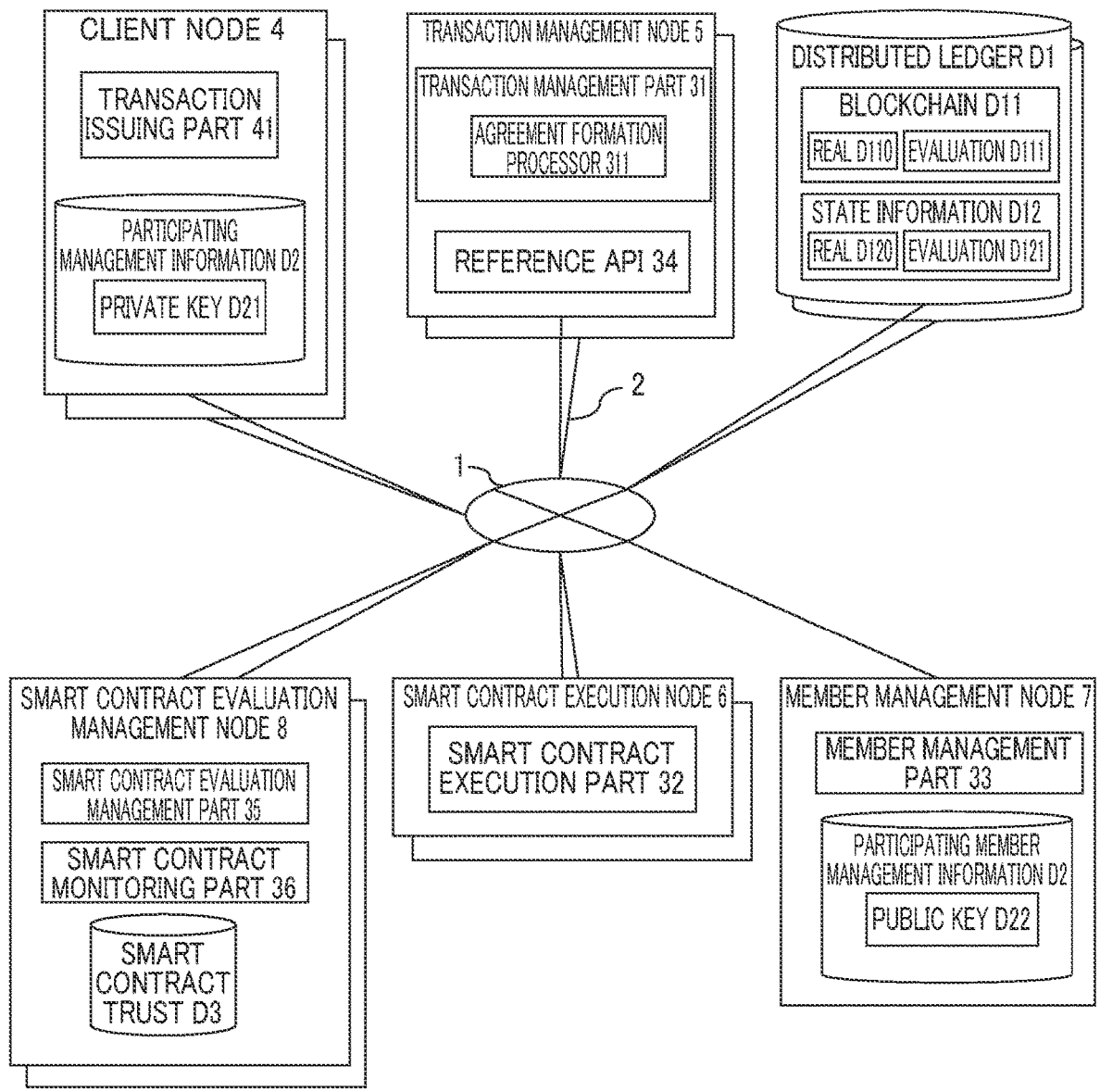
FIG. 13 is a diagram of a configuration example of a computer system having various functions in this embodiment placed on a plurality of nodes.

In the respective examples described above, although an example has been shown in which various types of functional parts are placed in a single verification node 3, they may be placed in different servers as far as they do not deviate from the functions. FIG. 13 illustrates a configuration example in which the respective functional parts are placed in the different servers.

Furthermore, the respective examples illustrate an example in which the client node 4 is associated with the BC network participant in one-to-one correspondence. The present invention is not limited to such a configuration, however. Instead of having the client node 4, each of the BC network participants may access to the client node 4 from an external terminal and access to the verification node 3 by way of the client node 4. In that case, the client node 4 may manage key information of more than one BC network participants.

In addition, the respective examples illustrate an example in which the evaluation execution transaction and the real execution transaction are present as different types of transactions. However, the evaluation execution transaction may be implemented as an option of the real execution transaction. It is possible to implement the present invention, by, for example, having, as information of an extended area of the real execution transaction, the evaluation ID and the expected value, or the like, that is, information for identifying whether or not to perform an evaluation, and input information of the performed evaluation.

In addition, although the respective examples illustrate a case in which the various types of mechanisms that perform the SC evaluation are implemented as the functions on side of the BC infrastructure, they can be built in as the functions on side of the SC (internal functions or common components of the SC). For example, an implementation method is possible such as treating a transaction with a specific identifier (for example, head of the user information starts with "test_") as the evaluation execution transaction, or the like. This implementation method compromises reliability, however, compared with a case of implementation with the functions on the side of the BC infrastructure. Specifically, unless the provider implements/provides this function, the user cannot confirm the credibility. In addition, a case cannot be sensed in which the provider switches an internal logic depending on the identifier. Furthermore, it is difficult to divide and manage data spaces for the real execution transaction and for the evaluation execution transaction.

Although the best mode for carrying out the invention or the like has been specifically described above, the present invention is not limited thereto, and may be modified in a variety of ways as far as it does not deviate from the scope of the present invention.

According to such embodiments, SC users (including prospective users) can confirm/evaluate credibility of an SC without being managed by a central authority. Provision of a mechanism by which any one can confirm/evaluate credibility of the SC at any time has the effect of suppressing provision of a poor-quality SC by a malicious provider. With an attempt/evaluation by the SC providers and a plurality of third parties, the credibility can be enhanced because the perspective of the third party is included, compared with the conventional evaluation method that has been intensively and unilaterally performed by a specific central organization, and sharing of information on the credibility makes it possible to reduce time and effort compared with a case in which the third party verifies individually. Use of a test/evaluation result by the plurality of third parties allows an evaluation of trust of the SC to be performed in a more objective manner.

More specifically, even without management by the central authority, the credibility of the quality of the smart contract itself can be confirmed/evaluated by the plurality of third parties other than smart contract providers.

The description of this specification reveals at least the following. More specifically, in a trust management method of this embodiment, a distributed ledger system may include and manage a verification result of the smart contract in the evaluation execution transaction, the verification result including a predetermined value for an evaluation specified by a predetermined node and an output value obtained when the predetermined value is inputted to the smart contract.

This allows for verification including a causal relation of input and output as the evaluation result of the smart contract.

In addition, in the trust management system of this embodiment, the distributed ledger system further performs processing of calculating, with a predetermined algorithm, trust related to at least any of an execution transaction and other evaluation execution transaction of the smart contract, with a predetermined evaluation execution transaction included in the blockchain as a reference.

This can identify, for example, a case with unequal and unfaithful contents in which application conditions of the smart contract differ among nodes, or the like, by checking and comparing transactions, thereby clarifying the trust of the smart contract itself.

In addition, in the trust management method of this embodiment, the distributed ledger system may further perform processing of controlling whether or not to approve or disapprove execution of the smart contract, depending on level of the calculated trust.

This allows for control that execution of any smart contract trust of which is lower than a predetermined standard is not permitted.

In addition, in the trust management method of this embodiment, the distributed ledger system may further perform processing of controlling whether to approve or disapprove execution of the smart contract, depending on whether or not at least any of the provider or the user of the smart contract registers the evaluation execution transaction with the blockchain.

This allows for restriction of execution of the smart contract for which the evaluation execution transaction is not registered, more specifically, which has not been evaluated or verified at all.

In addition, in the trust management method of this embodiment, the distributed ledger system may manage predetermined information related to the execution transaction and the evaluation execution transaction indifferent data areas, respectively, in the distributed ledger.

With this, even in the blockchain having a huge number of the execution transactions and the evaluation execution transactions, it is sufficient to refer to the data areas for the evaluation execution transaction only, when referring to the latest verification result of the smart contract, which thus improves the processing efficiency.

In addition, in the trust management method of this embodiment, the distributed ledger system may automatically issue the evaluation execution transaction at predetermined timing and perform the verification of the smart contract.

This makes it possible to execute a so-called unannounced evaluation execution transaction, which is unexpected for the smart contractor provider, and thus to produce a suppression effect against any inappropriate change to the smart contract, or the like.

In addition, in the trust management method of this embodiment, the distributed ledger system may preferentially process the execution transaction, of the execution truncation and the evaluation execution transaction in a predetermined period of time.

This allows a certain node included in the distributed ledger system to adequately avoid any condition in which processing of the execution transaction might be disturbed by processing of the evaluation execution transaction, such as a case in which an unnecessary large number of the evaluation execution transactions have been issued, or the like.

In a trust management system of this embodiment, each of nodes may include and manage a verification result of a smart contract in an evaluation execution transaction, the verification result including a predetermined value for evaluation specified by a predetermined node and an output value obtained when the predetermined value is inputted in the smart contract.

In the trust management system of this embodiment, at least any of the nodes may further perform processing of calculating, with a predetermined algorithm, trust related to at least any of an execution transaction and other evaluation execution transaction of the smart contract, with a predetermined evaluation execution transaction included in the blockchain as a reference.

In the trust management system of this embodiment, at least any of the nodes may further perform processing of controlling whether to approve or disapprove execution of the smart contract, depending on level of the calculated trust.

In the trust management system of this embodiment, at least any of the nodes may further perform processing of controlling whether to approve or disapprove the execution of the smart contract, depending on whether or not at least any of a provider or a user of the smart contract registers the evaluation execution transaction with the blockchain.

In the trust management system of this embodiment, each of the nodes may manage predetermined information related to the execution transaction and the evaluation execution transaction indifferent data areas, respectively, in the distributed ledger.

In the trust management system of this embodiment, at least any of the nodes may automatically issue the evaluation execution transaction at arbitrary timing and perform verification of the smart contract.

In the trust management system of this embodiment, at least any of the nodes may preferentially process the execution transaction, of the execution truncation and the evaluation execution transaction in a predetermined period of time.

REFERENCE SIGNS LIST

1 Network
2 Physical communication line
3 Verification node
10 Distributed ledger system (Trust management system)
100 Interface
101 Processor
102 Memory
103 Data bus
31 Transaction management part
311 Agreement formation processor
32 Smart contract execution part (SC execution part)
33 Member management part
34 Reference API
35 Smart contract evaluation management part (SC evaluation management part)
36 Smart contract monitoring part (SC monitoring part)
4 Client node
41 Transaction issuing part
D1 Distributed ledger
D11 Blockchain (BC)
D12 State information
D2 Participating member management information
D21 Private key
D22 Public key
D3 Smart contract trust calculation result (SC trust calculation result)

The invention claimed is:

1. A trust management system, the system comprising:
a plurality of verification nodes that each retain a distributed ledger; and
a plurality of transaction issuing nodes that each issue a transaction to each of the verification nodes,
wherein each of the plurality of verification nodes;
manages a smart contract and an execution transaction of the smart contract, as well as an evaluation execution transaction for the smart contract, in a blockchain managed by the each verification node;
includes and manages a verification result of the smart contract in the evaluation execution transaction, the verification result including a predetermined value for evaluation specified by a predetermined one of the transaction issuing nodes and an output value obtained when the predetermined value is inputted to the smart contract, and manages the output value in state information;
calculates, with a predetermined algorithm, a level of trust related to at least any of an execution transaction and other evaluation execution transaction of the smart contract, with the predetermined evaluation execution transaction included in the blockchain as a reference; and
controls whether to approve or disapprove execution of the smart contract, depending on the calculated level of trust,
wherein at least one of the plurality of verification nodes automatically issues the evaluation execution transaction at a predetermined timing and performs verification of the smart contract.

2. The trust management system according to claim 1, wherein each of the plurality of verification nodes:
controls whether to approve or disapprove execution of the smart contract, depending on whether or not at least any of a provider or a user of the smart contract registers the evaluation execution transaction with the blockchain.

3. The trust management system according to claim 1, wherein each of the plurality of verification nodes:
manages predetermined information related to an execution transaction and an evaluation execution transaction in different data areas, respectively, in a distributed ledger.

4. The trust management system according to claim 1, wherein each of the plurality of verification nodes:

preferentially processes the execution transaction and the evaluation execution transaction in a predetermined period of time.

5. A trust management method of a distributed ledger system including a plurality of verification nodes that each retain a distributed ledger; and a plurality of transaction issuing nodes that each issue a transaction to each of the verification nodes, the trust management method performed by each of the plurality of verification nodes and comprising the steps of:

managing, in a blockchain, a smart contract and an execution transaction of the smart contract as well as an evaluation execution transaction for the smart contract;

including and managing a verification result of the smart contract in the evaluation execution transaction, the verification result including a predetermined value for evaluation specified by a predetermined one of the transaction issuing nodes and an output value obtained when the predetermined value is inputted to the smart contract, and managing the output value in state information;

calculating, with a predetermined algorithm, a level of trust related to at least any of an execution transaction and other evaluation execution transaction of the smart contract, with the predetermined evaluation execution transaction included in the blockchain as a reference; and controlling whether to approve or disapprove execution of the smart contract, depending on the calculated level of trust, where at least one of the plurality of verification nodes automatically issues the evaluation execution transaction at a predetermined timing and performs verification of the smart contract.

6. The trust management method according to claim 5, further comprising the step of:

controlling whether to approve or disapprove execution of the smart contract, depending on whether or not at least any of a provider or a user of the smart contract registers the evaluation execution transaction with the blockchain.

7. The trust management method according to claim 5, further comprising the step of:

managing predetermined information related to an execution transaction and an evaluation execution transaction in different data areas, respectively, in a distributed ledger.

8. The trust management method according to claim 5, further comprising the step of:

preferentially processing the execution transaction and the evaluation execution transaction in a predetermined period of time.

* * * * *